(12) United States Patent
Bezine et al.

(10) Patent No.: US 10,311,109 B2
(45) Date of Patent: Jun. 4, 2019

(54) PERSONAL INFORMATION DISPLAY SYSTEM AND ASSOCIATED METHOD

(75) Inventors: Benjamin Bezine, Antibes (FR);
Benjamin Ruffier, Mandelieu (FR);
Richard Savornin, Valbonne (FR);
Ingolf-Tobias Rothe, Koettwitzsch (DE)

(73) Assignee: AMADEUS S.A.S., Biot (FR)

( * ) Notice: Subject to any disclaimer, the term of this patent is extended or adjusted under 35 U.S.C. 154(b) by 466 days.

(21) Appl. No.: 14/117,993

(22) PCT Filed: Jun. 6, 2012

(86) PCT No.: PCT/EP2012/002408
§ 371 (c)(1),
(2), (4) Date: Apr. 10, 2014

(87) PCT Pub. No.: WO2012/167924
PCT Pub. Date: Dec. 13, 2012

(65) Prior Publication Data
US 2014/0219583 A1    Aug. 7, 2014

(30) Foreign Application Priority Data
Jun. 7, 2011    (EP) .................................... 11305701

(51) Int. Cl.
*G06F 16/93*        (2019.01)
*G06Q 10/10*        (2012.01)
(Continued)

(52) U.S. Cl.
CPC .............. *G06F 16/93* (2019.01); *G06F 3/048* (2013.01); *G06K 9/00469* (2013.01);
(Continued)

(58) Field of Classification Search
CPC .... G06F 17/30011; G06F 3/048; G06F 16/93; G06K 9/00469; G06K 9/00483; G06Q 50/14; G06Q 10/10
See application file for complete search history.

(56) References Cited

U.S. PATENT DOCUMENTS 4,817,166 A    3/1989   Gonzalez et al.
5,970,484 A    10/1999  Church et al.
(Continued)

FOREIGN PATENT DOCUMENTS

CN    1428718         7/2003
CN    101432192       5/2009
JP    2010-238267 A1  10/2010

OTHER PUBLICATIONS

USPTO, Office Action issued in U.S. Appl. No. 13/180,319 dated Dec. 2, 2014.
(Continued)

*Primary Examiner* — Maria E Vazquez Colon
(74) *Attorney, Agent, or Firm* — Thompson Hine LLP (57) ABSTRACT

A system for identification and/or authentication of a user in a travel terminal, the system comprising: a multiuser interactive screen having one or more interaction zones, with which a user can interact; an image generation system for generating information on the interaction zone to provide information to the user with which the user can interact and; an image capture system which generates a captured image of any item in contact with the interaction zone; a recognition system for recognizing one or more features from the captured image to enable identification and/or authentication of the user; a communication system for communicating with the user by means of the image generation means to confirm identification or request additional information.

16 Claims, 5 Drawing Sheets

(51) Int. Cl.
  *G06Q 50/14* (2012.01)
  *G06F 3/048* (2013.01)
  *G06K 9/00* (2006.01)

(52) U.S. Cl.
  CPC ......... *G06K 9/00483* (2013.01); *G06Q 10/10* (2013.01); *G06Q 50/14* (2013.01)

(56) References Cited

U.S. PATENT DOCUMENTS

| | | | |
|---|---|---|---|
| 7,447,646 B1 | 11/2008 | Agarwal et al. | |
| 7,979,459 B2* | 7/2011 | Wu | G06Q 30/02 |
| | | | 705/1.1 |
| 7,983,452 B2* | 7/2011 | Chaney | G06F 21/33 |
| | | | 382/100 |
| 8,498,406 B2 | 7/2013 | Ghassabian | |
| 2002/0037097 A1 | 3/2002 | Hoyos et al. | |
| 2002/0083062 A1 | 6/2002 | Neal et al. | |
| 2002/0152100 A1* | 10/2002 | Chen | G06Q 10/02 |
| | | | 705/5 |
| 2004/0230472 A1 | 11/2004 | Venkat et al. | |
| 2005/0144098 A1 | 6/2005 | Vance et al. | |
| 2006/0002315 A1 | 1/2006 | Theurer et al. | |
| 2006/0045374 A1 | 3/2006 | Kim et al. | |
| 2006/0085477 A1 | 4/2006 | Phillips et al. | |
| 2006/0100914 A1 | 5/2006 | Jafri et al. | |
| 2006/0206351 A1 | 9/2006 | Hodges et al. | |
| 2006/0229958 A1 | 10/2006 | Sergio et al. | |
| 2008/0189279 A1 | 8/2008 | Mayer et al. | |
| 2008/0256057 A1 | 10/2008 | Riise et al. | |
| 2008/0279481 A1* | 11/2008 | Ando | G06F 17/30277 |
| | | | 382/306 |
| 2008/0302870 A1* | 12/2008 | Berini | G07C 9/00087 |
| | | | 235/380 |
| 2008/0313165 A1 | 12/2008 | Wu et al. | |
| 2009/0052751 A1 | 2/2009 | Chaney et al. | |
| 2009/0106170 A1 | 4/2009 | Thurlow et al. | |
| 2009/0177653 A1 | 7/2009 | Hirabayashi | |
| 2009/0276467 A1* | 11/2009 | Scholtes | G06F 17/3061 |
| 2010/0048288 A1 | 2/2010 | Canterbury et al. | |
| 2010/0293106 A1 | 11/2010 | Rhoads et al. | |
| 2011/0002014 A1 | 1/2011 | Tani et al. | |
| 2011/0071862 A1 | 3/2011 | Cator et al. | |
| 2011/0080344 A1* | 4/2011 | Dura | G06F 3/0416 |
| | | | 345/163 |
| 2011/0156864 A1* | 6/2011 | Green | G06K 19/025 |
| | | | 340/5.2 |
| 2011/0231212 A1 | 9/2011 | Hurley et al. | |
| 2012/0004894 A1 | 1/2012 | Butler et al. | |
| 2012/0030234 A1 | 2/2012 | Ramachandrula et al. | |
| 2012/0128240 A1* | 5/2012 | Rothschild | G06K 9/00 |
| | | | 382/165 |
| 2012/0316981 A1 | 12/2012 | Hoover et al. | |
| 2013/0055113 A1 | 2/2013 | Chazin et al. | |
| 2013/0138517 A1 | 5/2013 | Khan et al. | |
| 2013/0151344 A1 | 6/2013 | Tavares et al. | |
| 2014/0067435 A1 | 3/2014 | Hasnas et al. | |

OTHER PUBLICATIONS

European Search Report and European Search Opinion; European Patent Application No. 14305490.6; (dated Jun. 25, 2014).
Doermann, "The Indexing and Retrieval of Document Images: A Survey", Computer Vision and Image Understanding, Academic Press vol. 70 No. 3 Jun. 1, 1998.
European Patent Office, Search Report issued in European Application No. 11305701.2 dated Dec. 6, 2011.
European Patent Office, International Search Report issued in International Application No. PCT/EP2012/002408 dated Jul. 19, 2012.
USPTO, Office Action issued in U.S. Appl. No. 13/180,319 dated Sep. 13, 2013.
U.S. Non-Final Office Action; U.S. Appl. No. 13/180,319; (dated Mar. 2, 2016).
U.S. Non-Final Office Action; U.S. Appl. No. 14/325,847; (dated Mar. 11, 2016).
U.S. Non-Final Office Action; U.S. Appl. No. 14/187,698; (dated Mar. 16, 2016).
IP Australia, Patent Examination Report No. 2 issued in corresponding Application No. 2012266767 dated Feb. 10, 2016.
Chinese Patent Office, Office Action issued in corresponding Application No. 201280027773.8 dated Jan. 29, 2016.
Japanese Patent Office, Office Action issued in corresponding Application No. 2014-513941 dated Jan. 22, 2016.
USPTO, final Office Action issued in U.S. Appl. No. 13/180,319 dated Oct. 5, 2016.
USPTO, final Office Action issued in U.S. Appl. No. 13/180,319 dated Jul. 15, 2015.
USPTO, final Office Action issued in U.S. Appl. No. 13/180,319 dated Dec. 6, 2013.
USPTO, Office Action issued in U.S. Appl. No. 14/619,301 dated Feb. 23, 2018.

* cited by examiner

PERSONAL INFORMATION DISPLAY SYSTEM AND ASSOCIATED METHOD

FIELD OF THE INVENTION

The present invention relates to a personal information display system and associated method, particularly but not exclusively, for use in identifying passengers.

BACKGROUND OF THE INVENTION

In an airport or other travel terminal there are many passengers arriving to take flights or other voyages. Processing all the passengers is a time consuming exercise which often means a lot of queuing for the passengers. Passengers travel with documentation which is used to identify them and enables them to pass security controls and the like. Authenticating and checking the passenger documentation is an important part of the security process and has to be fulfilled in order for passengers to be allowed to travel. Improvements in this respect are always being sought.

Efforts have been taken to find automatic ways of authenticating and verifying documents. These include character based text recognition and document recognition processes which match characteristics or texts in the document with equivalent information in a database to authenticate a particular passenger.

U.S. Pat. No. 5,970,484 discloses a system for retrieving a document in a database by transmitting a user request through a fax machine. A search occurs in a database and the fax machine then sends the matching document back to the user. The method comprises searching for text similar to a sample text using character recognition and specific search parameters. A weighting technique is also applied to some of the sample text.

US2006/085477 discloses a system for retrieving electronic documents related to captured images through handheld devices, laptops etc and for providing a user with the retrieved electronic documents. The method also comprises searching for a document by using any image capture device to retrieve the document that matches the search, from a specific database. This is carried out by determining a set of text patterns and building a search query based on the text patterns.

US2002/037097 discloses a system for providing an improved purchase process for a customer by retrieving searched bills from a database and by processing a sale after authentication of the match between the customer and the matching bill. The search is accomplished by using barcode searching, optical recognition, and comparison of patterns.

US2009/177653 discloses a system for searching for text stored in a scanned image and for generating an electronic copy of a document based on the search. This is accomplished by scanning an original document, extracting keywords and searching for additional information based on the keywords.

The above-mentioned prior art documents solve some of the problems associated with authenticating and verifying passengers prior to travel. However, there are still flaws in the above described methods which remain to be overcome.

OBJECTS OF THE INVENTION

It is an object of the present invention to overcome at least some of the problems associated with the prior art.

It is a further object of the present invention to provide a system and method for improving the authentication and verification of passengers prior to travel.

It is a still further object of the present invention to provide a system and method which is user-friendly and easy to operate and reduces the waiting time for passengers prior to travel.

SUMMARY OF THE INVENTION

The present invention provides a method and system as set out in the accompanying claims. According to one aspect of the present invention there is provided a system for identification and/or authentication of a user in a travel terminal comprising:

a multiuser interactive screen having one or more interaction zones, with which a user can interact;

an image generation system for generating information on the interaction zone to provide information to the user with which the user can interact and;

an image capture system which generates a captured image of any item in contact with the interaction zone;

a recognition system for recognising one or more features from the captured image to enable identification and/or authentication of the user;

a communication system for communicating with the user by means of the image generation means to confirm identification or request additional information.

Optionally, the recognition system includes at least one of: a character recognition system; a logo recognition system; a barcode recognition system.

Optionally, the recognition system recognises one or more features of a heterogeneous data source comprising at least two different types of representation of information brought in contact with the interaction zone.

Optionally, in the recognition system, the types of representation of information comprise at least two of text, logo and barcode.

Optionally, the recognition system includes a matching engine for matching features from the item with one or more user records contained in a database of user information to determine the most likely matching user record.

Optionally, the matching engine is arranged to perform fuzzy searches on full-text versions of the user records contained in the database of user information.

Optionally, the matching engine is arranged to match categorised and typed information against indexes and to associate weighted matching scores to found user records depending on a presumed relevance of the respective user record.

Optionally, the system further comprises a database including a list of passengers potentially being in the travel terminal.

Optionally, the list of users potentially being in the travel terminal includes a PNR record and the database comprises a PNR database.

Optionally, the recognition system comprises an index module which is arranged to transform structured database fields of the database of user information and the PNR database, respectively, into an indexed full-text data.

Optionally, the multiuser interactive screen is in the form of a wall.

Optionally, at least some of the wall is made of an optically transmissive material.

Optionally, the system further comprises a printing system for printing travel related documents on identification or authentication of the user.

According to a second aspect of the present invention there is provided a method for identification and/or authentication of a user in a travel terminal using an identification system having a multiuser interactive screen having one or more interaction zones; an image generation system for generating information on the interaction zone; an image capture system which generates a captured image of any item in contact with the interaction zone; a recognition system for recognising one or more features from the captured image; and a communication system for communicating with the user by means of the image generation means to confirm identification or request additional information, the method comprising:

providing information to a user by illuminating part of the multiuser interactive screen so that the user may interact therewith;

detecting an item in contact with an interaction zone that is captured by the image capture system;

extracting one or more features from the captured image to identify or authenticate the user;

communicating identification or authentication or requesting further information by means of the image generation system on the screen.

Optionally, the method further comprises recognising the features using at least one of: a character recognition; a logo recognition; a barcode recognition.

Optionally, the method further comprises recognising one or more features of a heterogeneous data source comprising at least two different types of representation of information brought in contact with the interaction zone.

Optionally, the types of representation of information comprise at least two of text, logo and barcode.

Optionally, the method further comprises matching engine for matching features from the item with one or more user records contained in a database of user information to determine the most likely matching user record.

Optionally, the matching engine performs fuzzy searches on full-text versions of the user records.

Optionally, the matching engine matches categorised and typed information against indexes and associates weighted matching scores to found user records depending on a presumed relevance of the respective user record.

Optionally, the method further comprises determining a list of passengers potentially being in the travel terminal.

Optionally, the method further comprises determining a list of passengers potentially being in the travel terminal from a PNR record and a PNR database.

Optionally, an index module transforms structured database fields of the database of travel information and the PNR database, respectively, into an indexed full-text data.

Optionally, the method further comprises providing the multiuser interactive screen in the form of a wall.

Optionally, the method further comprises providing at least some of the wall made of an optically transmissive material.

Optionally, the method further comprises printing travel related documents on identification or authentication of the user.

The present invention offers many advantages over current systems and methods.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
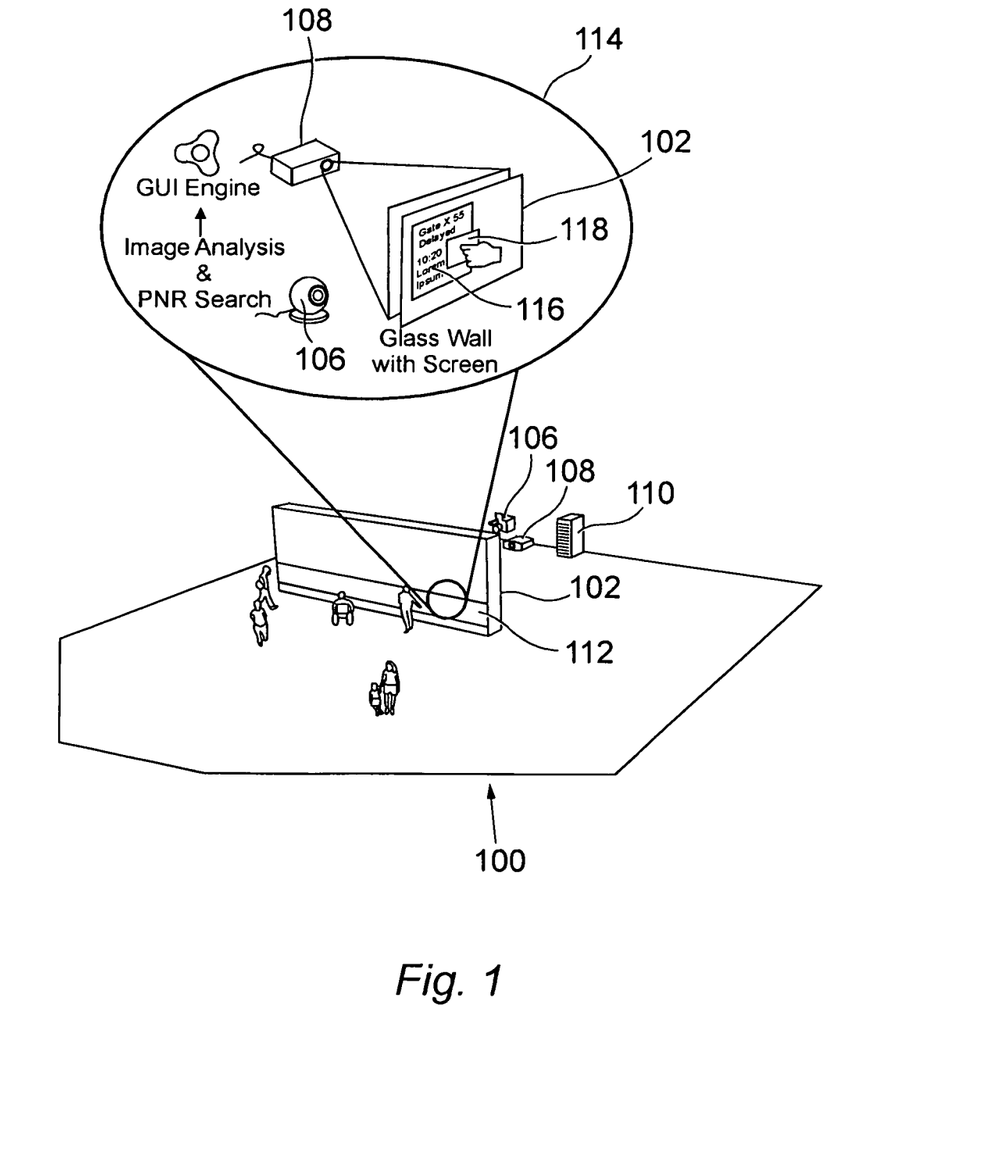
FIG. 1 is a schematic diagram of an overview of the personal information display system, in accordance with an embodiment of the invention.

The present invention relates to a personal identification display system (PIDS) shown generally at 100. The personal identification display system may be located in an airport or any other appropriate terminal, for example a station or car hire location. The system is used to recognize passengers and to enable the passengers to proceed to the next stage of the trip. For example, the passenger may be told how to: find a connecting flight gate, locate a rental car counter, find the way to the shuttle location, etc.

The personal identification display system includes a wall 102 which acts as a multi-user interactive screen. The wall may be any shape or size and may be located in any convenient location. At least part of the wall allows transmission of light therethrough and is optionally made of glass or other equivalent optically transmissive materials. The system also includes at least one camera 106, at least one video projector 108 and at least one server 110. The camera is used to detect user information and interactions; and to capture images (through the wall 102) for the optical character recognition processes that will follow. The video projector 108 displays messages, movies and passenger information onto the screen (through the wall 102) with which the passenger can interact and enter information. The information can be entered by placing a document against the window, which is then read by the camera and interpreted within the system. The server acts as a communication system and interacts with third-party and external systems to: manage a recognition system such as an optical character recognition processes; access databases; and manage the display of information onto the wall. Part of the wall provides an area of detection or interaction zone 112 which is adapted to be at a height suitable for passengers to bring travel documents in contact therewith so that they can be read by the camera 106.

In a further embodiment the wall may also be adapted to read biometric data from the passenger. This will serve as further verification of the user in conjunction with the passenger documentation.

The wall may include any appropriate detector or recognition system. The recognition of paper documents provide a system which ensures security and can potentially mean there are less people involved in the security processes within airports and the like. In addition, automation of some or all of the security processes will reduce queuing and delays.

An important part of the embodiment which uses documentary recognition as described below is the fact that the system is in communication with a Passenger Name Record (PNR) database (not shown). By having access to the PNR database the system is aware of potential passengers who are scheduled to be in the airport in the vicinity of the system on the day in question. This reduces the list of potential passengers and means that comparisons may be made first with passenger records of those passengers who are expected to be in the airport. This will be described in further detail below.

Part of the wall is shown in a blowup section 114. The blowup section shows boarding information 116 for a particular flight. A travel document 118 is placed against the glass wall by a user. The document may relate to a previous trip or a current trip. In fact, any document that contains information able to identify the traveler such as an ID card, Frequent traveler card, confirmation email, business card, credit card, or any document that contains some of the information stored in a PNR may be used. The manner in which the information is captured and utilized is unconstrained and no particular format or type of data is required. The system is able to read any appropriate document. In particular, the system is able to process heterogeneous sources which comprise two or more different types of representation of information. Such different types of representation comprise, for example, text, logos and barcodes. As an example, a frequent traveler card generally contains the name of the passenger, an ID of the card (such as a card number) and name and logo of the airline.

The boarding information may then be displayed on the wall by means of the projector 108. As previously mentioned, the travel documents are read by camera 106. The data from the camera is analyzed by character recognition and a search for a particular feature such as passenger name record (PNR) is carried out. A graphic user interface (GUI) engine is used in conjunction with the server to manage the various processes of analyzing the images from the camera and generating images to be displayed on the wall by the projector.

Figure 2:
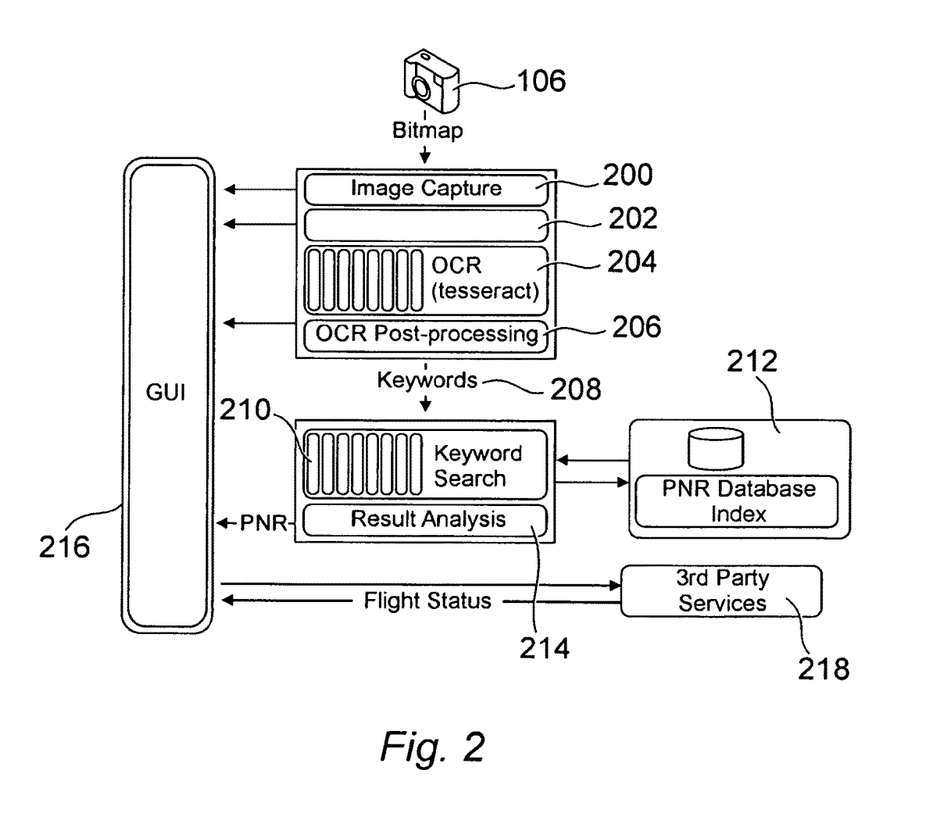
FIG. 2 is a block diagram of part of the FIG. 1 system, in accordance with an embodiment of the invention.

Referring now to FIG. 2, details of the processing steps and modules will now be described. The camera 106 sends a bitmap to an image capture module 200. The bitmap may include documentary representations or biometric data. In the case of a documentary representation the bitmap is processed in a processing module 202 and an optical character recognition process is applied to the representation of the document. Optical character recognition post-processing is then carried out by module 204 and keywords 206 are extracted by this module. A keyword search 208 is then carried out. The identified keywords are then compared with a passenger name record database index 210, such as pre-processed data calculated from the PNR database. In this case the search would be a full-text search index. As previously mentioned, the PNR database should be aware of passengers likely to be in the airport at the time in question. This will mean the database can be queried to ascertain a list of potential passengers: comparisons can then be made with this list of potential passengers at least in the first instance. The comparison with passenger name records in a Passenger Name Record (PNR) database 212, identifies the person to which the document relates. This is fed back to the result module 214. Throughout the process the various modules interact with a graphic user interface (GUI) 216 which passes information back to the passenger at the wall and, if necessary, requests further information.

The use of image recognition to analyse the logo and "guess" the airline or hotel chain may also be utilised. The images received from scanning the document could be compared with pre-loaded images on a database or other storage medium. The method of comparing images is well known and could be any appropriate type.

The present invention describes a novel way of complementing existing text search techniques with a context sensitive technique to allow fuzzy retrieval of database records. The technique goes beyond the present distance search algorithms which allow similarity searches for keywords.

More specifically, this invention allows a set of records to be searched with only part of the relevant keyword available, and even if there are errors in the recognition process. In addition, semantic reasoning is used to improve simple distance search techniques.

The following examples demonstrate some of the above-mentioned techniques and show how the system recognizes passengers. A Global Distribution System (GDS) has a large database where it is possible to search for a passenger based on the PNR and a name. In the example:

Alice John is traveling from Paris to New-York. The associated PNR (usually 6 alphanumeric characters) is 1A2B3C.

Bob Doe is traveling from Paris to San-Francisco, with PNR number=1A2B3D.

Bob Paris is traveling from Rome to Singapore with PNR number=AQWZSX.

It is generally easy to search for the details of a trip by searching the GDS using the following keywords and numbers (Name=Alice & PNR=1A2B3C) or (Name=Bob & PNR=1A2B3D). However, if a document has been badly scanned then some errors may be added to the result and the recognition process is then not straightforward. The following show some possible problem areas or errors:

The name and/or the PNR are misread, as a result the relevant information on a trip is difficult to find. For example: Name≠Allce & PNR≈1A2B3C.

Only the name and destination (or something close to it) is available, for example: Name≈Allce & Origin≈Baris.

Some words in a document within several words of other words are not correctly recognized. This makes it difficult to accurately determine all the relevant information. For example, the following terms are recognized≈Allce &≈1A2B8C & Amadeus employee. These may not lead to a logical search being conducted.

The word recognition is less accurate but more words are matching. For example, is "PNR≈1A2B8O & Origin≈Baris" related to Alice or Bob? If more information is available, even if it is less accurate it may be possible to determine the correct passenger. For example, if the additional information is "PNR≈1A2B8O & Origin≈Barls & destination≈Nex-Yurk", the most likely passenger is Alice.

Even if the recognition is perfect, without any errors, it is difficult to distinguish between different passengers. For example, when searching for Bob, Paris, #1A2B3D, it is difficult to distinguish: "Bob Doe ticket #1A2B3D" (matching FirstName=Bob and PNR=1A2B3D) from "Bob Paris ticket #AQWZSX" (matching FirstName=Bob and LastName=Paris)

This invention proposes a system and mechanism to predict the best suitable candidate result for the search, even if errors and problems as described above are encountered.

The prior art approaches described match general purpose use cases such as interne searches or knowledge base retrieval. The prior art approaches would be insufficient for specific applications which require safe predictions with respect to the nature and quality of the presented keywords and which require a retrieval of the most likely relevant dataset.

To overcome the problems, the present solution includes a process that uses a combination of methods and uses weight assignment based on a semantic keyword analysis and indexing plus the knowledge of potential candidates, for example, the passengers likely to be in this location at this time. In contrast to a field search the present invention does not require a structured input. This is especially useful if these words are determined from sensor data or from a heterogeneous source. Heterogeneous sources of data comprise two or more different types of representation of information, which comprise, in particular, text, logos and barcodes. A heterogeneous document may feature a number of elements of these information representations, for example, several text fields and several logos. In general, the location of these elements on the document and their semantics are unknown to the system a priori. Thus, after having scanned a heterogeneous data source, its respective elements of information representations are identified and analysed in order to find out their meaning and relevance for the purpose of identifying the respective person. The detailed explanations of this process will be described with reference to FIG. 3 below.

Other methods which can be adopted within the system of the present invention include recognition of barcodes, full text searching, logo recognition, etc.

A barcode is text or binary data in a binary image, which is encoded on two independent levels: firstly the data format itself, which is similar to a file format, defines the way the data is stored in the data stream; secondly, the symbology defines how the barcode will appear as an image. To decode a barcode it is necessary to know both the format and the symbology.

Once this is known, the decoding is guaranteed to be either a success or a failure, so there is no uncertainty on the reliability of the decoded data. Thus, barcodes are an efficient way to improve the search by providing valuable information which is well-characterized and known to be correct (or not).

Full text searching makes use of a defined system of rules and standards to convey passenger information. For each traveler or group a PNR is created. The record contains all details about the trip (e.g. air, hotel, car and other segments) as well as handling information for the companies involved in the process of the trip (travel agency, airline, hotel etc.). The transformation of the travel industry to paperless procedures and online processes has led to the necessity to enable the passenger to query the PNR to be informed about the trip and possible changes. Online information systems allow this information to be transformed into a human readable form. The form is often enriched with additional information and has become a central part of the life of a passenger. One approach to finding the necessary information is to use full text index and search by providing a certain amount of soft criteria to determine a list of matching PNRs. It is then only necessary to determine the most relevant.

Logo recognition is based on the idea of collecting and storing a database of brand logos. The logo search engine is able to extract a logo from the input image, match it against the database and determine the most probable brand and/or product from it. It is also robust to image deformation, color changes, scale variation and is another search value with a well defined key: the brand or product, depending on the logo.

Figure 3:
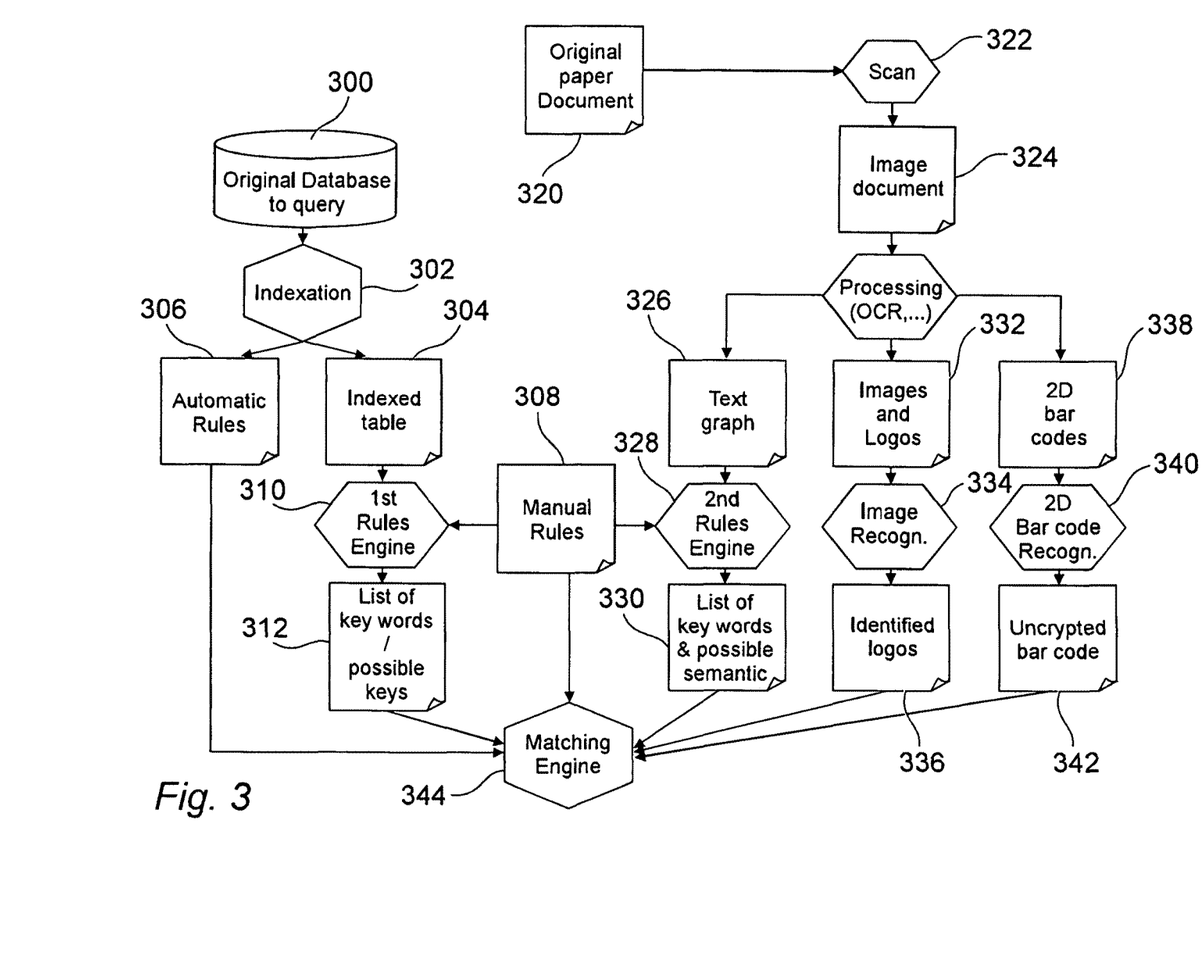
FIG. 3 is a flow chart of the recognition processes carried out by the system, in accordance with an embodiment of the invention.

Referring now to FIG. 3, the overall architecture of the document recognition process, will now be described. The invention makes use of an index mechanism to build a table of all possible keys and related values for those keys. In addition, certain rules for specific situations are always adhered to. For example, a PNR is always 6 alphanumeric characters, and an e-ticket reference is always 13 numerical values. Proximity rules may also exist, in which the e-ticket reference could always be in proximity with the words: "e-ticket", "ETK", etc. In addition, the first name is very often close to the surname; either before or after which may help in the identification of a unique passenger. Another important rule is to set priorities: for example finding an e-ticket reference is much more likely to identify a unique passenger than a string of words that could be interpreted in a number of different ways. As such, the search engine is encouraged to look for numerical values in advance of word values, as the numerical values are more likely to be unique.

The process of FIG. 3 can be split into two phases, a supply phase and a query phase. In the supply phase, data relating to the airport and associated infrastructure are indexed into the system. This is shown essentially on the left-hand side of the diagram. The query phase relates to passenger identification information and the manner in which that is processed to be matched against data provided by the supply phase. The query phase is shown essentially on the right-hand side of the diagram. A database 300 contains the data of all relevant customers including all passengers that will or have used the airport in a predetermined period. The data is then indexed by an index module 302 by transforming the structured database fields into full-text data, which is then indexed using well-known full-text indexing techniques. The result is an indexed table 304. In addition, the structure of the database is also taken into account to create automatic rules 306. These rules will allow greater precision with certain queries. For example, if a name can be indexed so that when it is recognized in the input customer query, it will provide a more reliable result than if full-text search is required. The use of the PNR database is likely to give rise to the most certain results and is an important feature of optimising the search. The algorithm is efficient because it is not limited to "guess" what is written, but instead suggests the best traveler from a pre-defined list of potential passengers supposed to be in the vicinity of the wall at this time. Manual rules 308 can be added in order to take into account other factors. The manual rules are applied to the indexed table as a first rules engine 310. This results in the generation of a list of key words or possible keys. These are then used with the automatic rules by the matching engine 312 in a later phase.

In a first instance a customer presents a heterogeneous document 320 to the capture device and a scan 322 is generated by any appropriate means. The image of the document 324 is generated and processed as follows. The image undergoes optical character recognition 326 which generates an 10 output of raw text. Manual rules may be applied to this text 328 in order to remove irrelevant words or perform potential semantic guesses. For example, "Name: Alice" will be interpreted and "Alice" will be categorised as a name. The final output is a list of key words and possible semantics 330. A logo or image recognition process 332 will be applied to the data 15 to identify a brand and/or product associated with a logo or image. This will use image recognition 334 to generate identified logos 336. Barcode decoding extraction 338 will be carried out to identify any 1D or 2D barcodes. This will use barcode recognition techniques 340 to generate unencrypted barcodes 342. The results of the three processes include 20 free text and categorised information. For example, the name of a brand recognized from its logo will be tagged as such. All extracted data is then transferred to the matching engine.

Figure 4:
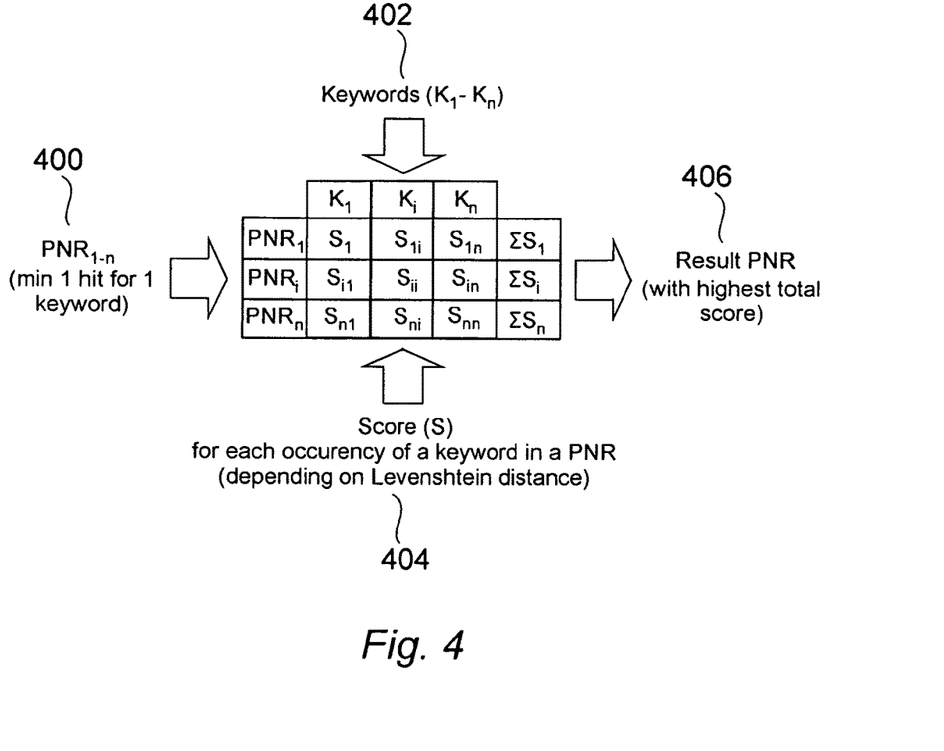
FIG. 4 is a block diagram of a matching engine used in the system, in accordance with an embodiment of the invention.

The matching engine uses the records collected in the supply phase as a database of information, and attempts to find or match the most relevant record from the query phase with that of the supply phase. This matching may comprise two processes. Firstly, regarding the non-categorised free-text information, with every word of free text data, the matching engine performs a fuzzy search in respect of the full-text version of a record. By using fuzzy searching and querying techniques, 100% exact matches are not required in order to locate words which were captured in the heterogenous documents in the indexed text database records. Rather, positive results are also found if records deviate from input character strings to some extent. By this, matching on inputs containing noise e.g. introduced due to scanning or character recognition errors can be performed more efficiently. Secondly, the categorised and typed information is used and matched against the indexes obtained by the automatic and manual rules. Each query returns a list of records, with an associated matching score as shown in FIG. 4. For a given record, all the scores are summed with a given weight. The weight enables the identification of the importance to data which is believed to be more relevant than other data. For example, a name can be considered to be more relevant than a word without category information in the free text flow. The record with the highest score sum is returned as the result of the matching process.

FIG. 4 shows the input of possible relevant PNRs 400 and key words 402. A score 404 is generated for each occurrence of the keywords in a 10 PNR record. The score is generated based on the Levenshtein distance. For example, for PNR1: the score is S11 for keyword (l), S1i for keyword (i) and S1n for keyword (n). The sum of the scores is then calculated and the highest sum is determined to be the most likely PNR matching to the search.

Once a passenger has been recognised with the above-mentioned recognition process, the fact that the passenger is in the airport can be communicated to the airport systems. If validation has also occurred the wall may generate a boarding pass or other appropriate documents to allow a passenger to enter onto an airplane or move to the next stage of booking. Alternatively, the system may merely validate that a particular passenger is in the airport and will be making use of the booking or checking in systems due course.

Where documentary data has been recognised the mostly likely passenger will have been recognised and information will be displayed on the wall. This information may include information to continue the trip such as plane delays, directions to the next gate, stopover information, etc. As the wall can be viewed by others, the data should not show too much information which would lead to privacy issues.

The system of the present invention enables documentary validation of a passenger to reduce the queues and delays normally encountered in a travel terminal. The wall is a user-friendly interface which enables passengers to identify themselves with ease and which enables the airport to have early information relating to passengers in the terminal. The airport systems may use the fact that a passenger is in the terminal to call that passenger to check-in or board as the case may be. The fact that the airport is aware that a passenger is in the terminal can help to minimise delays.

The wall is referred herein as a solid rectangular structure including optically transparent material and other materials such as bricks or concrete. However it will be appreciated that the wall can be any shape, size, orientation or material.

Figure 5:
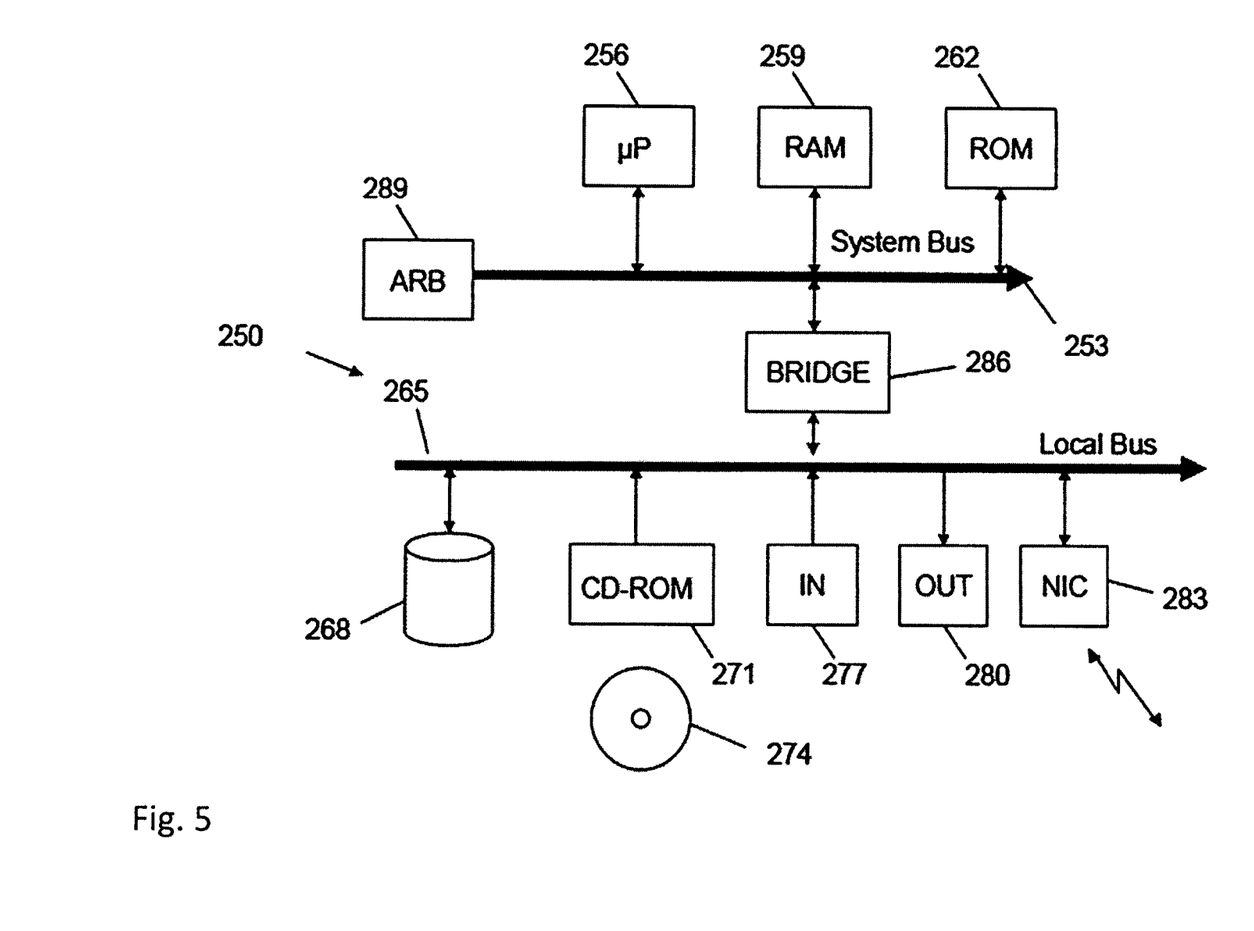
FIG. 5 is a diagram of a server system in accordance with an embodiment of the invention.

A possible technical implementation of server 110 as shown in FIG. 1 is depicted in FIG. 5. In FIG. 5, server 110 is illustrated as a computer 250 which is formed by several units that are connected in parallel to a system bus 253. In detail, one or more microprocessors 256 control operation of the computer 250; a RAM 259 is directly used as a working memory by the microprocessors 256, and a ROM 262 stores basic code for a bootstrap of the computer 250. Peripheral units are clustered around a local bus 265 (by means of respective interfaces). Particularly, a mass memory for storing the databases described herein, such as the PNR database, consists of a hard-disk 268 and a drive 271 for reading CD-ROMs 274. Moreover, the computer 250 includes input devices 277 (for example, a keyboard and a mouse), and output devices 280 (for example, a monitor and a printer, the latter one might serve as the printing system for printing travel related documents on identification or authentication of the user). A Network Interface Card 283 is used to connect the computer 250 to a network. A bridge unit 286 interfaces the system bus 253 with the local bus 265. Each microprocessor 256 and the bridge unit 286 can operate as master agents requesting an access to the system bus 253 for transmitting information. An arbiter 289 manages the granting of the access with mutual exclusion to the system bus 253. Similar considerations apply if the system has a different topology, or it is based on other networks.

The present invention is described with reference to an airport terminal but could be used in other terminals or any place where users have to queue or be identified to access a location such as rail stations, hotel registration desks, car rental desks, etc.

The present invention has been described with reference to both software programs and applications and hardware modules. It will be appreciated that the functions carried out as part of the invention could be carried out in either software or hardware modules or any combination thereof, irrespective of the examples given herein.

It will be appreciated that there are many variations of the various features described above, which can fall within the scope of the present invention.

The invention claimed is:

1. A system for identification and/or authentication of a user in a travel terminal, the system comprising:
   a multiuser interactive screen having an interaction zone with which the user can interact;
   an image generation and display unit configured to generate and display information on the interaction zone to provide information to the user with which the user can interact;
   an image capture system configured to generate a captured image of a document relating to the user when the document is in contact with the interaction zone, wherein the document and the captured image each includes one or more first features that are each of a first type and one or more second features that are each of a second type, the first type differing from the second type, and each of the first type and the second type being a logo type, a barcode type, or a character type; and
   a recognition system implemented by a processor and configured to:
      search a Passenger Name Record (PNR) database of a Global Distribution System for passenger information associated with details of a trip, the PNR database including a plurality of first PNR records;
      determine a plurality of second PNR records that are associated with a passenger scheduled to be at the travel terminal during a predetermined period based at least in part on the passenger information associated with the details of the trip stored in the plurality of first PNR records, wherein the plurality of second PNR records are a subset of the plurality of first PNR records; and in response to the captured image of the document being generated, automatically:
recognize the one or more first features and the one or more second features from the captured image;
in response to the one or more first features and the one or more second features being recognized:
generate free-text data and first categorized data based on the one or more first features; and
generate second categorized data based on the one or more second features; and
select one of the plurality of second PNR records as a PNR record most likely matching the user based on the free-text data, the first categorized data, and the recognized one or more second categorized data.

2. The system of claim 1, wherein each of the second PNR records includes one or more structured database fields, and the recognition system is further configured to:
transform the one or more structured database fields of the second PNR records into indexed full-text data; and
generate one or more keywords for the second PNR records based on the indexed full-text data,
wherein the recognition system is configured to select the one of the second PNR records as the PNR record most likely matching the user based on the free-text data, the first categorized data, and the second categorized data by:
searching the indexed full-text data based on the free-text data; and
matching the first and second categorized data against the one or more keywords.

3. The system of claim 1, wherein each of the one or more second features comprises a logo, and the recognition system is configured to generate the second categorized data based on the one or more second features by:
comparing the logo of each second feature with pre-loaded images on a database relating to logos, each of the pre-loaded images being associated with a brand;
for each logo, determining one of the pre-loaded images that matches the logo based on the comparison; and
for each matching pre-loaded image, determine the brand associated with the matching pre-loaded image, wherein the second categorized data includes each determined brand.

4. The system of claim 2, wherein the search of the indexed full-text data based on the free-text data comprises a plurality of fuzzy searches of the indexed full-text data based on the free-text data.

5. The system of claim 2, wherein the recognition system is further configured to select the one of the second PNR records as the PNR record most likely matching the user based on the recognized one or more first features and the recognized one or more second features by:
associating a weighted matching score to each of the second PNR records based on the searching and the matching; and
select the second PNR record associated with a highest weighted matching score as the PNR record most likely matching the user.

6. The system of claim 1, wherein the recognition system is further configured to:
search the first PNR records based on an identification of the travel terminal and the predetermined period, wherein each of the first PNR records is associated with the passenger scheduled to be at the travel terminal during the predetermined period.

7. A method for identification and/or authentication of a user in a travel terminal, the method comprising:
searching a Passenger Name Record (PNR) database of a Global Distribution System for passenger information associated with details of a trip, the PNR database including a plurality of first PNR records;
determining a plurality of second PNR records that are associated with a passenger scheduled to be at the travel terminal during a predetermined period based at least in part on the passenger information associated with the details of the trip stored in the plurality of first PNR records, wherein the plurality of second PNR records are a subset of the plurality of first PNR records;
providing, by an image generation unit, information to the user by illuminating an interaction zone of a multiuser interactive screen so that the user may interact therewith;
capturing, by an image capture system, an image of a document relating to the user when the document is in contact with the interaction zone, wherein the document and the captured image each includes one or more first features that are each of a first type and one or more second features that are each of a second type, the first type differing from the second type, and each of the first type and the second type being a logo type, a barcode type, or a character type; and
in response to the image of the document being captured, automatically:
recognizing, by a recognition system implemented by a processor, the one or more first features and the one or more second features from the captured image;
in response to the one or more first features and the one or more second features being recognized:
generating free-text data and first categorized data based on the one or more first features; and
generating second categorized data based on the one or more second features; and
selecting, by the recognition system, one of the plurality of second PNR records as a PNR record most likely matching the user based on the free-text data, the first categorized data, and the recognized one or more second categorized data.

8. The method of claim 7, wherein each of the second PNR records includes one or more structured database fields, and further comprising:
transforming the one or more structured database fields of the second PNR records into indexed full-text data; and
generating one or more keywords for the second PNR records based on the indexed full-text data,
wherein selecting the one of the second PNR records as the PNR record most likely matching the user based on the free-text data, the first categorized data, and the second categorized data comprises:
searching the indexed full-text data based on the free-text data; and
matching the first and second categorized data against the one or more keywords.

9. The method of claim 8, wherein searching the indexed full-text data based on the free-text data comprises conducting a plurality of fuzzy searches of the indexed full-text data based on the free-text data.

10. The method of claim 8, wherein selecting the one of the second PNR records as the passenger record most likely matching the user based on the recognized one or more first features and the recognized one or more second features comprises:

associating a weighted matching score with each of the second PNR records based on the searching and the matching; and selecting the first passenger record associated with a highest weighted matching score as the PNR record most likely matching the user.

11. The method of claim 7, further comprising:

searching the first PNR records based on an identification of the travel terminal and the predetermined period, wherein each of the first PNR records is associated with the passenger scheduled to be at the travel terminal during the predetermined period.

12. A computer program product comprising:

a non-transitory computer readable medium; and instructions stored on the non-transitory computer readable medium that, upon execution by one or more processors, cause the one or more processors to:

search a Passenger Name Record (PNR) database of a Global Distribution System for passenger information associated with details of a trip, the PNR database including a plurality of first PNR records;

determine a plurality of second PNR records that are associated with a passenger scheduled to be at a travel terminal during a predetermined period based at least in part on the passenger information associated with the details of the trip stored in the plurality of first PNR records, wherein the plurality of second PNR records are a subset of the plurality of first PNR records;

provide information to a user by illuminating an interaction zone of a multiuser interactive screen so that the user may interact therewith;

capture an image of a document relating to the user when the document is in contact with the interaction zone, wherein the document and the captured image each includes one or more first features that are each of a first type and one or more second features that are each of a second type, the first type differing from the second type, and each of the first type and the second type being a logo type, a barcode type, or a character type; and in response to the image of the document being captured, automatically:

recognize the one or more first features and the one or more second features from the captured image;

in response to the one or more first features and the one or more second features being recognized:

generate free-text data and first categorized data based on the one or more first features; and generate second categorized data based on the one or more second features; and select one of the plurality of second PNR records as a PNR record most likely matching the user based on the free-text data, the first categorized data, and the recognized one or more second categorized data.

13. The system of claim 1, wherein each of the one or more first features is one or more characters, and the recognition system is configured to generate the first categorized data based on the one or more first features by:

applying a plurality of manual rules to the one or more first features to determine a plurality of categorized items, wherein each of the categorized items includes at least one of the one or more characters of one of the one or more first features, and the first categorized data includes the categorized items.

14. The system of claim 1, wherein the one or more first features and the one or more second features have respective locations on the document that are not preprogrammed into the system.

15. The method of claim 7, wherein each of the one or more first features is one or more characters, and generating the first categorized data based on the one or more first features comprises:

applying a plurality of manual rules to the one or more first features to determine a plurality of categorized items, wherein each of the categorized items includes at least one of the one or more characters of one of the one or more first features, and the first categorized data includes the categorized items.

16. The method of claim 7, wherein the one or more first features and the one or more second features have respective locations on the document that are not preprogrammed into the recognition system.

* * * * *